(12) United States Patent
Reinold et al.

(10) Patent No.: US 8,194,536 B2
(45) Date of Patent: Jun. 5, 2012

(54) VEHICLE ACTIVE NETWORK WITH FAULT TOLERANT DEVICES

(75) Inventors: Juergen Reinold, Palatine, IL (US); Donald J. Remboski, Dearborn, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 302 days.

(21) Appl. No.: 09/943,882

(22) Filed: Aug. 31, 2001

(65) Prior Publication Data
US 2003/0043739 A1 Mar. 6, 2003

(51) Int. Cl.
*G01R 31/08* (2006.01)
*H04J 1/16* (2006.01)
*H04L 1/00* (2006.01)

(52) U.S. Cl. ......... 370/218; 370/230; 370/234; 370/241

(58) Field of Classification Search .................. 370/228, 370/386, 400, 401
See application file for complete search history.

(56) References Cited

U.S. PATENT DOCUMENTS

| | | | |
|---|---|---|---|
| 5,559,959 A * | 9/1996 | Foglar | 714/43 |
| 5,732,074 A * | 3/1998 | Spaur et al. | 370/313 |
| 5,739,761 A * | 4/1998 | Kobayashi | 701/35 |
| 6,094,416 A * | 7/2000 | Ying | 370/222 |
| 6,134,589 A | 10/2000 | Hultgren | |
| 6,292,718 B2 * | 9/2001 | Staiger | 701/1 |
| 6,292,741 B1 * | 9/2001 | Bitzer et al. | 701/115 |
| 6,317,438 B1 | 11/2001 | Trebes, Jr. | |
| 6,434,459 B2 * | 8/2002 | Wong et al. | 701/36 |
| 6,505,100 B1 | 1/2003 | Stuempfle et al. | |
| 6,554,738 B1 * | 4/2003 | Bek | 477/107 |
| 2002/0051427 A1 | 5/2002 | Carvey | |

FOREIGN PATENT DOCUMENTS

| | | | |
|---|---|---|---|
| EP | 645919 A2 * | 3/1995 | |
| EP | 0884873 A2 | 12/1998 | |
| WO | WO 00/77620 A2 | 12/2000 | |
| WO | WO 01/19038 A1 | 3/2001 | |
| WO | WO 01/39435 A2 | 5/2001 | |

OTHER PUBLICATIONS

Corwin Light-Williams, Joshu Drake:"Linux PPP howto", Linux howtos, Online!, Oct. 19, 2000, pp. 83-84.*
Walton Fehr et al., "Graphical Modeling and Code Generation for Distributed Automotive Control Systems", SEA Technical Paper Series, Aug. 21-23, 2000, vol. 2000-01-3061, pp. 1-10, SEA International, Warrendale, PA, U.S.A.
Joe Lograsso et al., "Low Power Flexible Controls Architecture for General Motors Partnership for a New Generation (PNGV) Precept Vehicle", 2000 Society of Automotive Engineers, Inc., vol. 2000-01-C060, p. 1-15.
Walton Fehr, "Vehicle Worthy Rapid Prototype Communication and Control System", SEA Technical Paper Series, Apr. 14-15, 1999, vol. 1999-01-1879, pp. 1-6.
Knight S. et al.: "Virtual Router Redundancy Protocol", RFC 2338, Apr. 1998, XP002135272.

(Continued)

*Primary Examiner* — Chi Pham
*Assistant Examiner* — Soon-Dong Hyun

(57) ABSTRACT

A vehicle active network (12) communicatively couples devices (14-20) within a vehicle (10). Device operation is independent of the interface (22-28) of the device (14-20) with the active network (12). Additionally, the architecture of the active network (12) provides one or more levels of communication redundancy. The architecture provides for the total integration of vehicle systems and functions, and permits plug-and-play device integration and upgradeability.

20 Claims, 8 Drawing Sheets

OTHER PUBLICATIONS

Lemahieu P. et al.: "Fault-Tolerant Switched Local Area Networks", Parallel Processing Symposium, 1998, IPPS/SPDP 1998, Proceedings of the First Merged IEEE Symposium on Parallel and Distributed Processing 1998, Orlando, FL, USA, Mar. 30-Apr. 3, 1998, Los Alamitos, CA, USA, IEEE Comput. Soc., US, Mar. 30, 1998, pp. 747-751, XP010276731.

Tennenhouse, D. L. et al., "Towards an Active network Architecture". [Online] Available http://www.tns.lcs.mit.edu/, as document http://www.acm.org/sigs/sigcomm/ccr/archive/1996/apr96/ccr-9604-tennenhouse.pdf.

Tennenhouse, D.L. et al., "A Survey of Active network Research", IEEE Communications Magazine, Jan. 1997, 0163-6804/97, 1997 IEEE, pp. 80-86.

* cited by examiner

VEHICLE ACTIVE NETWORK WITH FAULT TOLERANT DEVICES

RELATED APPLICATIONS

The present invention is related to the following applications which are assigned to the same assignee as the present invention:

VEHICLE ACTIVE NETWORK, filed Aug. 31, 2001, having Ser. No. 09/945,581;

VEHICLE ACTIVE NETWORK WITH RESERVED PORTIONS, filed Aug. 31, 2001, having Ser. No. 09/944,892;

VEHICLE ACTIVE NETWORK WITH DATA REDUNDANCY, filed Aug. 31, 2001, having Ser. No. 09/943,908;

VEHICLE ACTIVE NETWORK WITH COMMUNICATION PATH REDUNDANCY, filed Aug. 31, 2001, having Ser. No. 09/943,870;

VEHICLE ACTIVE NETWORK ADAPTED TO LEGACY ARCHITECTURE, filed Aug. 31, 2001, having Ser. No. 09/945,585;

LINKED VEHICLE ACTIVE NETWORKS, filed Aug. 31, 2001, having Ser. No. 09/944,653;

VEHICLE ACTIVE NETWORK WITH DATA ENCRYPTION, filed Aug. 31, 2001, having Ser. No. 09/944,883;

VEHICLE ACTIVE NETWORK AND DEVICE, filed Aug. 31, 2001, having Ser. No. 09/944,887;

VEHICLE ACTIVE NETWORK WITH BACKBONE STRUCTURE, filed Aug. 31, 2001, having Ser. No. 09/943,921;

VEHICLE ACTIVE NETWORK TOPOLOGIES, filed Aug. 31, 2001, having Ser. No. 09/944,891; and DATA PACKET FOR A VEHICLE ACTIVE NETWORK, filed Aug. 31, 2001, having Ser. No. 09/943,914.

BACKGROUND OF THE INVENTION

1. Field of the Invention

The invention relates generally to the field of communication systems for vehicles such as automobiles and trucks, and more particularly, to communicatively coupling devices within the vehicle.

2. Description of the Related Art

Microprocessor technology has greatly improved the efficiency, reliability and safety of the automobile. Microprocessor devices have enabled airbags, anti-lock brakes, traction control, adaptive suspension and power train control just to name a few of the areas where processing technology has literally transformed the automobile. These systems, first provided by manufacturers only on the most expensive luxury and performance automobiles, are now common and even standard equipment on the most affordable economy models. Soon, control-by-wire applications will become equally commonplace. For example, throttle-by-wire has been successfully implemented on a number of vehicle platforms. Steer-by-wire and brake-by-wire applications are not far behind. Alternative fuel vehicles, including fuel cell vehicles, electric and hybrid vehicles will require still more sophisticated control applications, and hence still more processing capability.

The automobile is simultaneously being enhanced by information technology. Satellite navigation systems, voice and data communications, and vehicle telemetry systems inform the driver, entertain the passengers and monitor vehicle performance. These systems can provide driving directions, identify points of interest along the driver's route, remotely diagnose and/or predict vehicle problems, unlock the doors, disable the vehicle if stolen or summon emergency personnel in the event of an accident.

The growing amount and level of sophistication of vehicle oriented information technology presents the challenge to the automotive engineer to implement and integrate these technologies with existing and emerging vehicle systems in an efficient manner. Current design philosophy centers on the incorporation of one or more vehicle communication bus structures for interconnecting the various control elements, sensors, actuators and the like within the vehicle. The design of these bus structures is often driven by compliance with governmental regulations such as second-generation on-board diagnostics (OBD-II) and federal motor vehicle safety standards (FMVSS). These structures offer limited ability to adapt new technology to the vehicle. Moreover, given the typical four-year design cycle and ten-year life cycle of an automobile, the technology within a vehicle may become significantly obsolete even before the vehicle is brought to market, and the bus architecture leaves the owner little ability to adapt new technology to the vehicle. Notwithstanding these limitations, the bus architecture offers a generally reliable, relatively fast platform for linking electronic devices and systems within the vehicle.

To link vehicle system technologies with vehicle information technologies, there has been proposed to incorporate a network architecture within the vehicle. For example, published Patent Cooperation Treaty (PCT) application number WO 00/77620 A2 describes an architecture based on the Ethernet wherein devices within the vehicle are coupled to the network. This publication describes a network including a cable backbone to which the devices are coupled and a network utility for controlling communications between the devices over the network. Important to note is that the proposed network does not integrate the vehicle systems, but instead is adapted to provide a platform for adding information technologies, such as pagers, personal digital assistants, navigations, etc. technologies to the vehicle. The power train, suspension, braking and airbag systems, as examples, utilize a vehicle bus for data communications, and these systems operate autonomously of the network described in the publication. A bridge or gateway is provide to couple the vehicle bus to the network as a device or client allowing data sharing between the bus and the network, but the data communication needs of the vehicle systems are not serviced by the network. A reason that these systems are designed to operate autonomously of the described network is that they have time critical, system critical data requirements that cannot be met by the network structure described. Additionally, the network described in the publication suffers from numerous single points of failure, such as if the cable backbone is disrupted or the network utility fails.

Thus there is a need for an architecture for automotive electronic systems that facilitates the efficient, reliable integration of in-vehicle electronic technologies and plug-and-play upgradeability.

BRIEF DESCRIPTION OF THE DRAWINGS

The invention is described in terms of the several preferred embodiments set out fully below and with reference to the following drawings in which like reference numerals are used to refer to like elements through out.

DETAILED DESCRIPTION OF THE PREFERRED EMBODIMENTS

An architecture for automotive functional systems according to the invention is based upon inter-networking and computing principles. The architecture incorporates a vehicle active network for communicatively coupling devices within the vehicle. Device operation is independent of the interface of the device with the active network. Additionally, the architecture of the active network provides one or more levels of communication redundancy. The architecture provides for the total integration of vehicle systems and functions, and permits plug-and-play device integration, scalability and upgradeability.

The active network may include a plurality of communicatively coupled active elements, which permit communication between devices coupled to the active network without a network utility or arbiter. The active elements enable multiple simultaneous communication paths between devices within the vehicle. The multiple simultaneous communication paths may include a variety of potential paths among the active elements, including, for example, alternative paths responsive to network status, redundant paths or even a loop having a loop data rate different from a path data rate of other communication paths.

The active network may be based upon packet data principles and implement any suitable packet data transmission protocol. Suitable packet data protocols include, but are not limited to, transmission control protocol/Internet protocol (TCP/IP), asynchronous transfer mode (ATM), Infiniband, and RapidIO. Each of these protocols, when implemented in an active network according to the various embodiments of the invention, permits one or more levels of redundant communication capability to ensure reliable data transfer while permitting active system diagnostics and fault tolerance.

The active network may incorporate a fabric of active network elements communicatively coupling the devices. The fabric permits multiple simultaneous peer-to-peer communications. The active network elements may be arranged in, for example, an array topology, a multi-drop topology, or an asymmetric topology. Furthermore, the architecture may incorporate one or more levels of wireless communication. For example, the architecture supports peer-to-peer, one-to-many broadcast, many-to-many broadcast, intra-network and inter-network communications, device to network, vehicle-to-vehicle and vehicle to remote station wireless communications.

Many additional advantages and features of the invention will be apparent from the description of the various preferred embodiments. At the outset it is important to point out that the invention is described in terms of embodiments implemented within a vehicle, or more particularly, an automobile. The terms vehicle and automobile as used herein may include automobiles, trucks, buses, trailers, boats, airplanes, trains and the like. Therefore, references to vehicle or automobile apply equally to virtually any type of commercially available vehicle.

Figure 1:
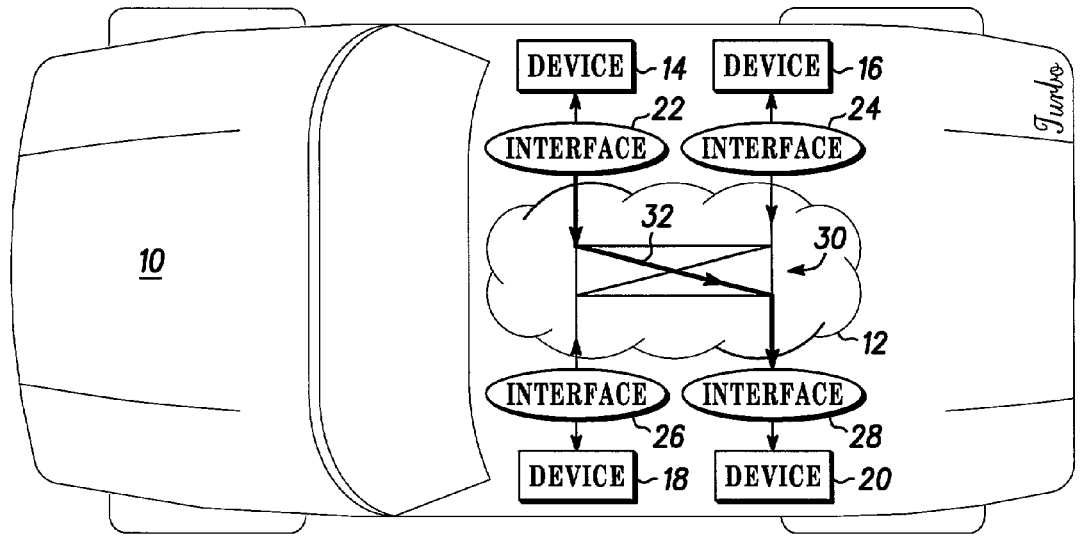
FIG. 1 is a block diagram illustration of an embodiment of a vehicle active network according to the invention.

FIG. 1 illustrates a vehicle 10 including an active network 12 to which various vehicle devices 14-20 are coupled via respective interfaces 22-28. The devices may be sensors, actuators and processors used in connection with various vehicle functional systems and sub-systems, such as, but not limited to, control-by-wire applications for throttle, braking and steering control, adaptive suspension, power accessory control, communications, entertainment, and the like.

The interfaces 22-28 are any suitable interface for coupling the particular device to the active network 12, and may be wire, optical, wireless or combinations thereof. The interfaced device is particularly adapted to provide one or more functions associated with the vehicle. These devices may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a device, and carried by the active network 12, is independent of the function of the device itself. That is, the interfaces 22-28 provide device independent data exchange between the coupled device and the active network 12.

Figure 2:
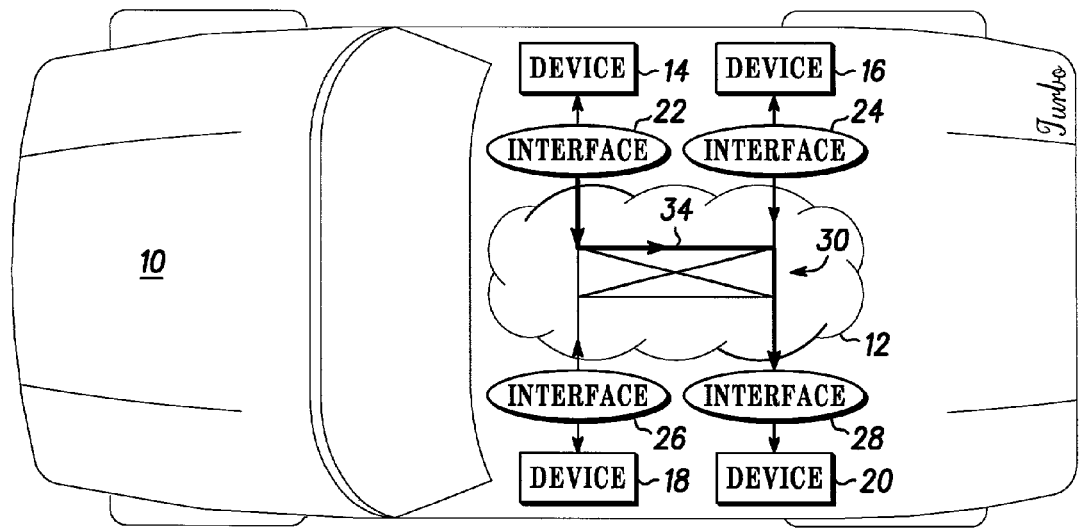
FIG. 2 is a block diagram illustration of the vehicle active network shown in FIG. 1 illustrating multiple communication path capability of the vehicle active network.

The active network 12 defines a plurality of communication paths 30 between the devices. The communication paths 30 permit multiple simultaneous peer-to-peer, one-to-many, many-to-many, etc. communications between the devices 14-20. Illustrated in FIG. 1, a communication path 32, illustrated by the bold arrowed lines, may be formed between device 14 and device 20. This is not the only communication path available for communications between devices 14 and 20. Illustrated in FIG. 2, a path 34 may also couple devices 14 and 20. During operation of the vehicle 10, data exchanged between devices 14 and 20 may utilize paths 32 and 34 or other paths between the devices. In operation, a single path may carry all of a single data communication between the device 14 and the device 20, or several communication paths may carry portions of the data communication. Subsequent communications may use the same path or other paths as dictated by the then state of the active network 12. This provides reliability and speed advantages over bus architectures that provide single communication paths between devices, and hence are subject to failure with failure of the single path. Moreover, communications between other of the devices 14-20 may occur simultaneously using the communication paths 30.

The active network 12 may comply with transmission control protocol/Internet (TCP/IP), asynchronous transfer mode (ATM), Infiniband, RapidIO, or other packet data protocols. As such, the active network 12 utilizes data packets, having fixed or variable length, defined by the applicable protocol. For example, if the active network 12 uses asynchronous transfer mode (ATM) communication protocol, ATM standard data cells are used.

Figure 3:
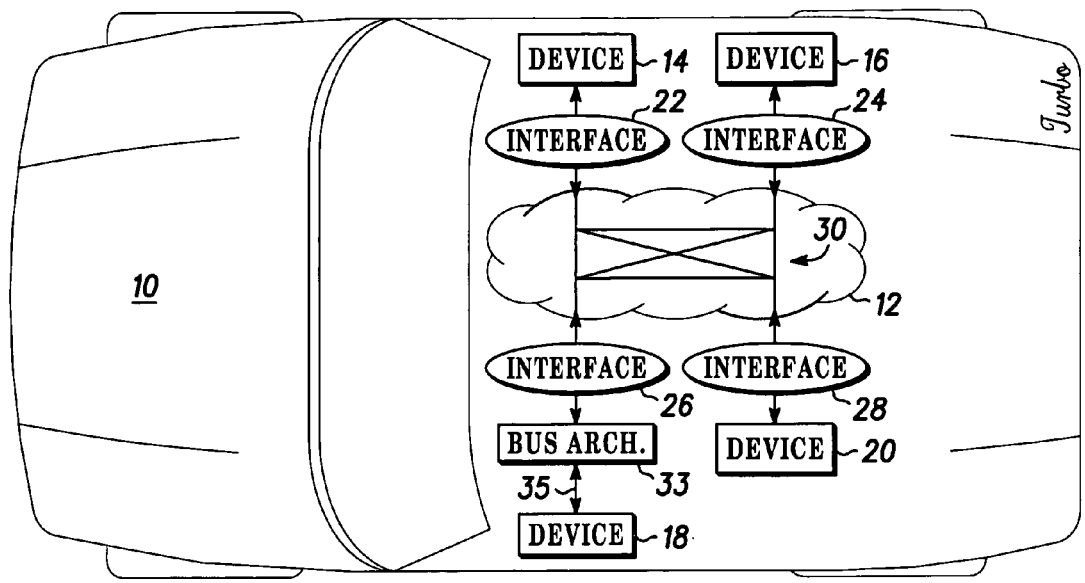
FIG. 3 is a block diagram illustration of an alternate embodiment of a vehicle active network.

The devices 14-20 need not be discrete devices. Instead, the devices may be systems or subsystems of the vehicle and may include one or more legacy communication media, i.e., legacy bus architectures such as CAN, LIN, FLEXRAY or similar bus structures. In such embodiments, the respective interface 22-28 may be configured as a proxy or gateway to permit communication between the active network 12 and the legacy device 14-20. Alternatively, and referring to FIG. 3, the device 18 of the vehicle 10 is communicatively coupled via an interface 3 5 to a bus architecture 33. The bus architecture 33 is then coupled via the interface 26 to the active network 12. The bus architecture may be a CAN, LIN, FLEXRAY or similar bus structure.

Figure 4:
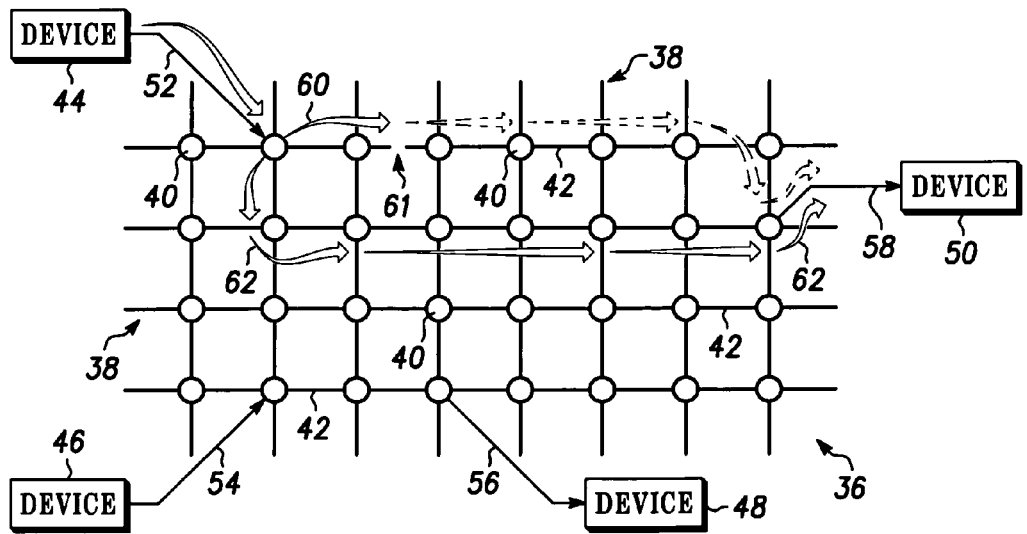
FIG. 4 is a graphic illustration of an embodiment of the vehicle active network according to the invention.

Referring to FIG. 4, an active network 36 in accordance with an alternate embodiment of the invention includes a fabric 38 of active network elements 40 communicatively coupling a plurality of devices 44-50 via respective interfaces 52-58. Connection media 42 interconnects the active network elements 40. The connection media 42 may be bounded media, such as wire or optical fiber, unbounded media, such as free optical or radio frequency, or combinations thereof. In addition, the term active network element is used broadly in connection with the definition of the fabric 38 to include any number of intelligent structures for communicating data packets within the active network 36 without an arbiter or other network controller and may include: switches, intelligent switches, routers, bridges, gateways and the like. Data is thus carried through the network 36 in data packet form guided by the active elements 40.

The cooperation of the active elements 40 and the connection media 42 define a plurality of communication paths between the devices 44-50 that are communicatively coupled to the active network 36. For example, a route 60 defines a communication path from device 44 to device 50. If there is a disruption 61 along the route 60 inhibiting communication of the data packets from the device 44 to the device 50, for example, if one or active elements are at capacity or have become disabled or there is a disruption in the connection media joining the active elements along the route 60, a new route, illustrated as route 62, can be used. Route 62 may be dynamically generated or previously defined as a possible communication path, to ensure the communication between the device 44 and the device 50.

Figure 5:
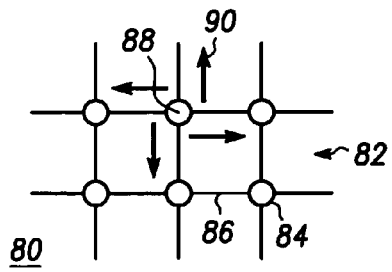
FIG. 5 is a graphic illustration of a portion of the vehicle active network illustrated in FIG. 4 illustrating propagation of timing information throughout the network.

In some applications, it may be necessary to provide synchronized activity, which requires timing information be available within the active network. FIG. 5 illustrates a portion 80 of an active network that includes a fabric 82 of active elements 84. Connection media 86 interconnects the active elements 84. Active element 88 is defined as a root node or a root element. A spanning tree algorithm may be used in association with the active network to define the plurality of communication paths available within the active network. The plurality of communication paths may be defined by the spanning tree algorithm during an initial configuration, or may be defined by a running of the spanning tree algorithm during each power on cycle or by other periodic running of the spanning tree algorithm. Timing may be propagated from the root node element 88 in the form of timing messages 90 from the root node, active element 88, to each of the active elements 84 via the plurality of communication paths. From the root node, the spans of connecting media 86 between each active element 84, and hence any delay in clock cycles in such spans, is known, and therefore from the root node precise timing may be established at each of the active elements 84 and likewise at each of the devices coupled to the active network. Timing within the active network may be absolute, or may be differential.

Differential, or relative, timing is possible based on the configuration of the active network and the data packets. The point-to-point connections within the active network allow accurate calculation of time to traverse the network. Thus, one is able to know when a packet was generated based upon the point in the network it started at, the route it took, and when it arrived at the current point. The time the packet was generated is thus, "now" minus x units of time, where the x units of time is the known time based on the route. In this scenario for timing, a central or root node may not be required.

Timing information within the network may degrade, for example as the result of clock skew. Having the root node send periodic timing messages refreshes the timing information. Data packets communicated within the active network may also contain timing information allowing individual devices to update the timing information on an ongoing basis. Of course, the data packets may also contain timing information to indicate when certain activities are to take place, or to indicate the freshness of the information. Other methods for establishing timing within the active networks apart from the root node concept may be employed.

Figure 6:
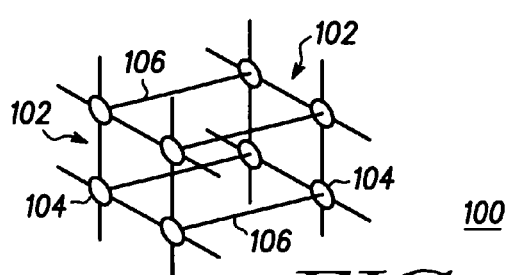
FIG. 6 is a graphic illustration of an alternate embodiment of a three-dimensional vehicle active network.

FIG. 6 illustrates an active network 100 including a fabric 102 of active network elements 104 arranged in a three-dimensional configuration. Connection media 106 communicatively couples the active network elements 104. The connection media may be wire, optical, radio frequency or combinations thereof. The three-dimensional configuration of fabric 102 may be used in connection with virtually any of the embodiments of an active network in accordance with the invention, and demonstrates the flexibility and scalability of such active networks.

Figure 7:
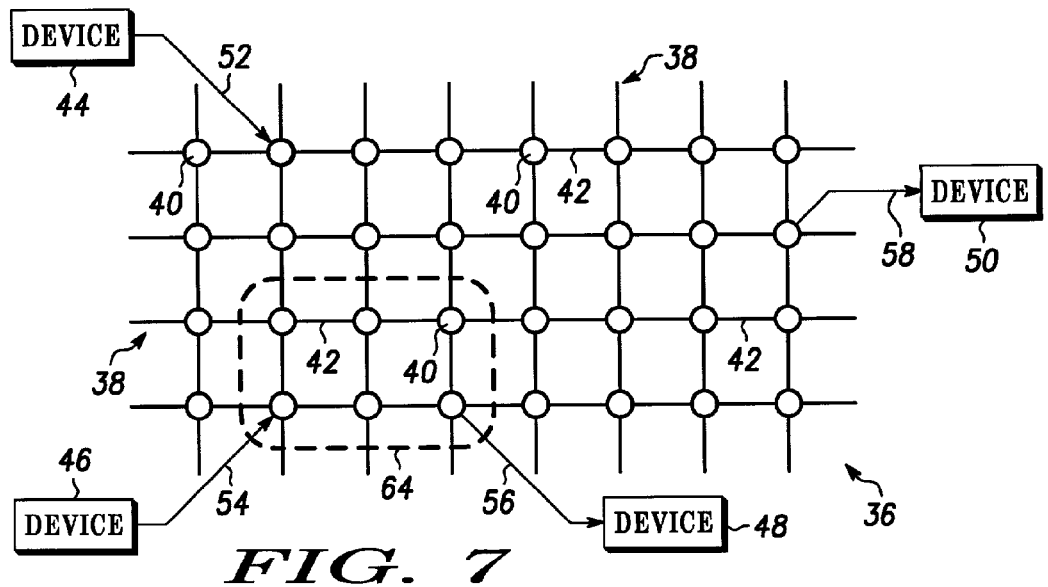
FIG. 7 is a graphic illustration of an alternate embodiment of a vehicle active network according to the invention incorporating a No-Go zone.

FIG. 7 illustrates the active network 36 (FIG. 4) modified to include a No-Go zone 64. The No-Go zone 64 exclusively reserves a portion of the fabric 38, namely the active elements and connection media contained within the No-Go zone 64, for communication of data between device 46 and the device 48. The No-Go zone 64 may reserve a sufficient portion of the fabric 38 to provide a plurality of possible communication paths between the devices 46 and 48, or may reserve a single communication path. The No-Go zone 64 may be configured to carry data packets to/from the device 46 and to/from the device 48 to the exclusion of any other data packets. Alternatively, the No-Go zone 64 may be available for communication of data packets to/from any device provided that data packets to/from devices 46 and 48 have transmission priority. Still further, criteria may be established relating to the use of the No-Go zone 64 to transmit data to/from devices other than devices 46 and 48. For example, where a fault in the switch fabric requires use of the No-Go zone 64 or where the non-exclusive use of the No-Go zone 64 does not exceed a threshold percentage of the overall capacity of the No-Go zone.

The No-Go zone 64 provides assured communication capability between the devices associated with the No-Go zone 64. For example, if the devices 46 and 48 are associated with a steer-by-wire application, proper vehicle function requires that the data for this application be transmitted to the appropriate devices. Providing priority to the data packets associated with the steer-by-wire application and transmitting them within the switch fabric 38 generally may not sufficiently ensure the data packets are timely delivered. However, reserving a portion of the switch fabric 38, i.e., the No-Go zone 64, provides the advantages of a hard connection between the devices while preserving the flexibility of utilizing the entire switch fabric 38, if needed, should a fault occur within the No-Go zone 64. While described in connection with the active network 36 illustrated in FIG. 4, the concept of the No-Go zone may be applied to any of the active network architectures contemplated by the invention, including those shown in the embodiments illustrated in FIGS. 1 and 2. Furthermore, while the No-Go zone 64 is shown as two-dimensional in FIG. 7, the No-Go zone 64 may correspond in dimension to that of the fabric of active network elements. Also, the No-Go zone 64 may be dynamically redefined during operation of the vehicle.

The multi-path architecture of the active network 12 and the active network 36 permits fault tolerance and fault diagnosis to be easily incorporated via data stream replication. Fault tolerance may be provided using replicated data packets sent along the same communication path or multiple data paths. An embodiment wherein data packets are replicated and transmitted along redundant paths is illustrated in FIG. 8, which again depicts the active network 36. Device 46 is communicatively coupled to the fabric 38 by interface 54. At switch element 66, data packets received from the device 44 are replicated, forming two streams of data packets (data streams). Of course more than two data streams may be generated, and additional data streams add additional levels of redundancy. The data streams are transmitted from the device 44 to the device 50 via different communication paths, and paths 68 and 70 are two of the numerous possible paths that may be formed in the switch fabric 38 from the device 46 to the device 50. Not all data packets need to travel on the same path, and the paths 68 and 70 merely illustrate the concept of the redundant paths. The redundancy provided by the two data streams (replicated data packets) enhances reliability because a failure or disruption of one of the streams does not completely interrupt transmission of the data between the devices. Moreover, by monitoring receipt of the data streams at the device 50 it is possible to determine whether a fault exists in the fabric 38, and to isolate the fault to a region of the fabric 38. That is, the fault will lie on one of the two paths 68 and 70 on which the transmission of the respective data stream failed. Additionally, performance of the fabric 38 may be measured based upon time of arrival data of the two data streams.

Figure 9:
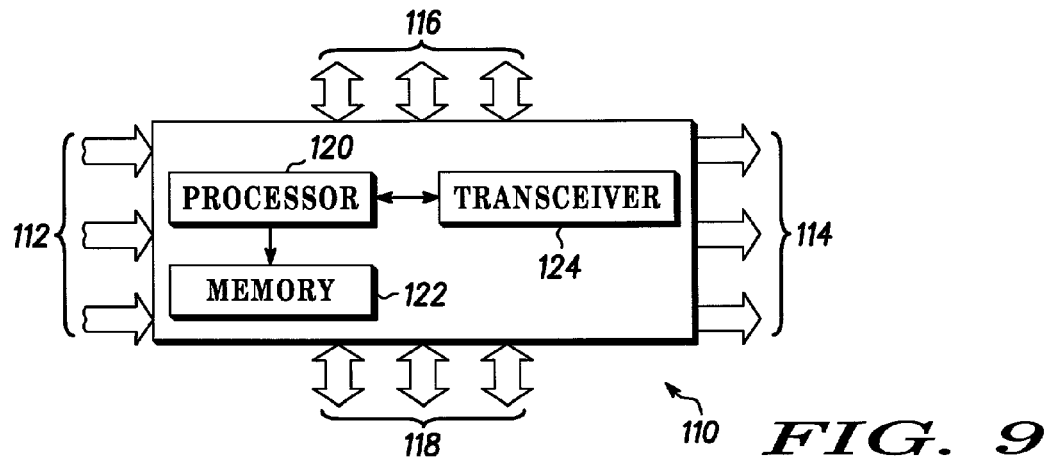
FIG. 9 is a schematic illustration of an embodiment of an active network element according to the invention.

FIG. 9 illustrates an active element 110 that may be used in connection with the fabric 38. To illustrate the functionality and the adaptability of the active element 110, it is shown to include a plurality of input ports 112, output ports 114 and input/output ports 116 and 118. Various configurations of the active element 110 having more or fewer ports may be used in an active network depending on the application. The active element 110 may further include a processor 120 coupled with a memory 122. The processor 120 includes a suitable control program for effecting the operation of the active element 110 for coupling inputs to outputs in order to transmit data packets within fabric 38.

The simplex input ports 112 and output ports 114 may be adapted for optical media, while the duplex input/output ports 116 and 118 may be adapted for electrical media. Additionally, the active element 110 may include a radio frequency (RF) transceiver 124 for RF transmission of data packets to other switch elements within the switch fabric 38 and to switch elements of other active networks, for example active networks located in nearby vehicles. The switch element 110 may be an assembly of circuit components or may be formed as a single integrated circuit device.

Figure 8:
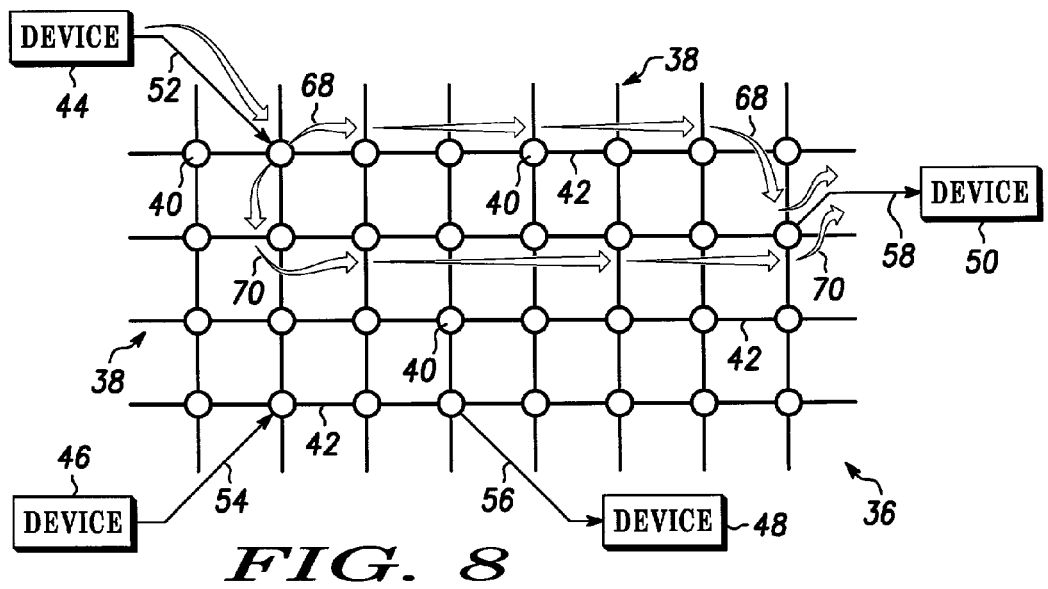
FIG. 8 is a graphic illustration of an embodiment of a vehicle active network according to the invention providing packet redundancy.
Figure 10:
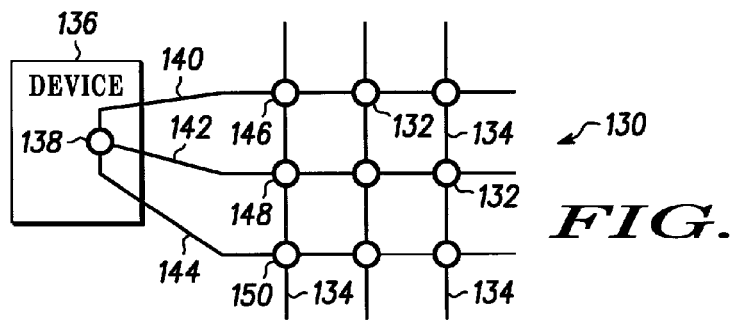
FIG. 10 is a schematic illustration of an embodiment of a vehicle active network including a device forming a portion of the vehicle active network.

FIG. 10 illustrates an alternate embodiment providing fault tolerance and fault detection. As illustrated in FIG. 8, a single interface 52 couples the device 44 to the fabric 38. Failure of the interface 52 would result in the device 44 becoming uncoupled from the fabric 38. Referring then to FIG. 10, a portion 130 of a fabric, such as fabric 38, includes a plurality of active elements 132 communicatively coupled by connecting media 134. A device 136 is communicatively coupled to the portion 130. The device 136 includes an active element 138 integral to the device, and providing a plurality of input/output ports. The plurality of input/output ports, three of which are illustrated in FIG. 10, couple to interfaces 140, 142 and 144. The interfaces 140, 142 and 144 are communicatively coupled to switch elements 146, 148 and 150, respectively, of the portion 130. In this manner, the device 136 is communicatively coupled via a plurality of communication paths to the portion 130 of the fabric. Data streams may be communicated along each of the communication paths to a destination device. This adds reliability by providing redundant paths from the device 136 to the fabric. It is also possible to determine the existence and locations of faults and fabric performance by monitoring the receipt of the data streams at the destination device along each of the plurality of communication paths.

Figure 11:
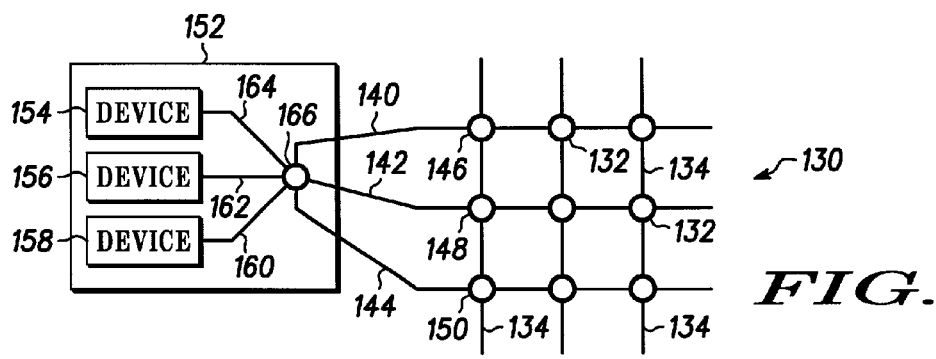
FIG. 11 is a schematic illustration of an alternate embodiment of a vehicle active network including a device forming a portion of the vehicle active element.

In FIG. 11, the device 136 of FIG. 10 has been replaced by a sub-system 152. The sub-system 152 includes a plurality of devices 154-158 that are coupled via interfaces 160-164, respectively, to an active element 166 within the device 136. The active element 166 is then coupled to the portion 130 of the fabric. The active element 166 may couple data streams from one or more of the devices 160-164 to the portion 130. Moreover, the data streams may be coupled on multiple communication paths 140-144 to the portion 130.

Figure 12:
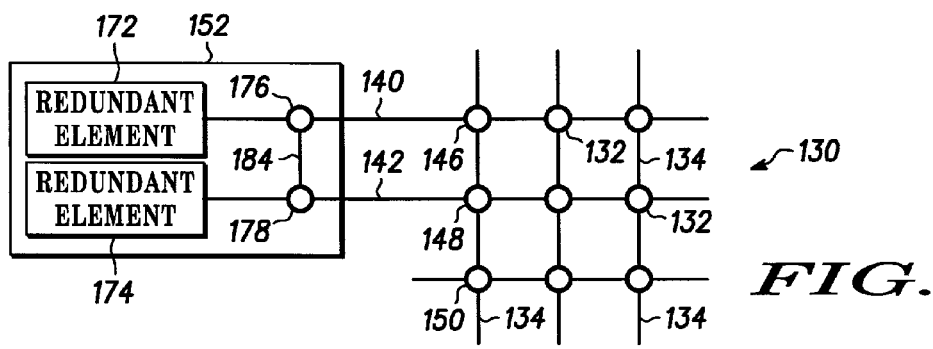
FIG. 12 is a schematic illustration of an alternate embodiment of a vehicle active network including a device forming a portion of the vehicle active element.

In FIG. 12, the device 170 includes redundant elements 172 and 174. That is, each of elements 172 and 174 are designed to provide the required function of the device 170. In addition to providing a vehicle-related function, the device 170 also includes device elements 176 and 178, i.e., active network elements integrated within the device 170 which also form a portion of the active network. The device elements 176 and 178 are coupled to active elements 146 and 148 of the portion 130. The device elements 172 and 174 are also coupled to each of the active elements 176 and 178 within the device 170 via connection media 184. Redundant function and redundant coupling of the device 170 to the fabric is provided by this arrangement ensuring that failure of either device elements 172 or 174 and/or failure of active elements 176 and 178 and/or active elements 146 and 148 will not cause a loss of the function of the device 170.

Figure 13:
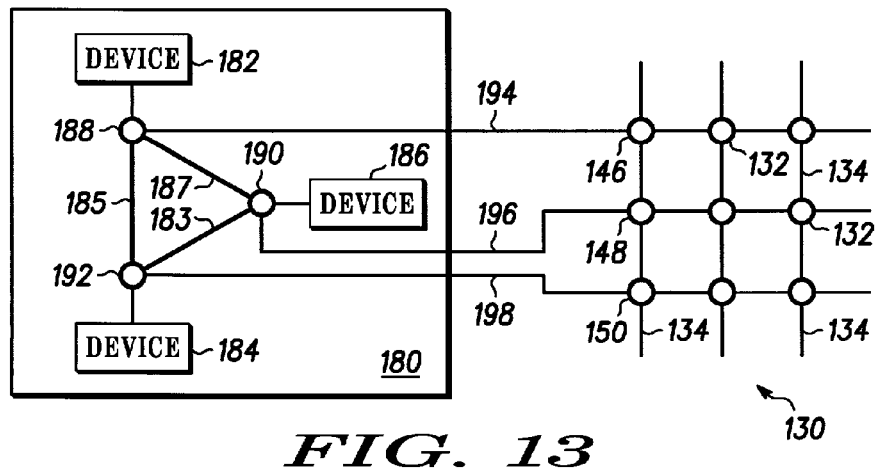
FIG. 13 is a schematic illustration of an alternate embodiment of a vehicle active network including a device forming a portion of the vehicle active element.

In FIG. 13, the system 180 includes devices 182, 184 and 186. Each of devices 182-186 may be designed to provide the same function, i.e., triple redundancy, or may provide separate functions. The system 180 also includes device elements 188-192. The device elements 188-192 are respectively coupled to active elements 146-150 of the portion 130. The device elements 188-192 are also coupled to each other by connection media 183-187. Thus, triply redundant function and coupling is provided.

Figure 14:
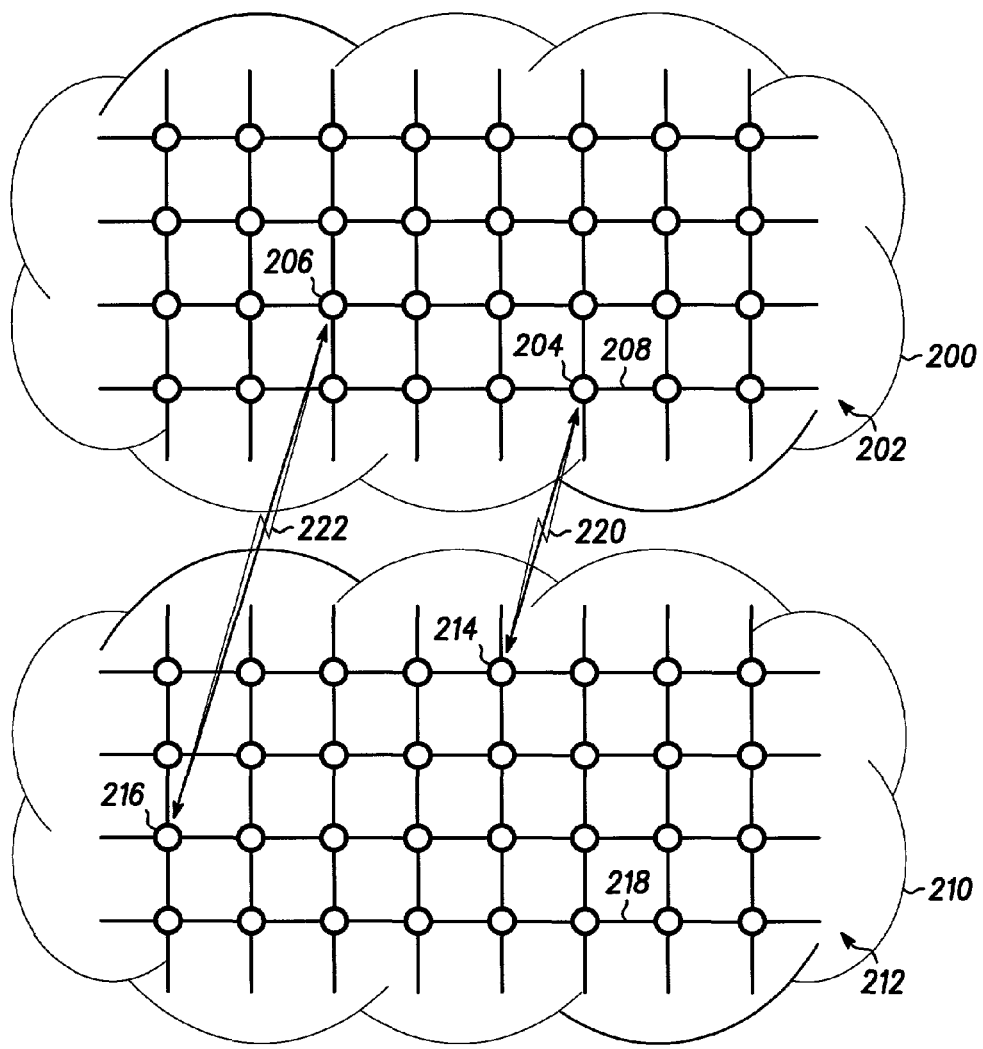
FIG. 14 is a block diagram illustration of linked active networks according to an alternate embodiment of the invention.

FIG. 14 illustrates wireless coupling of active networks across vehicles. A first vehicle 200 includes an active network 202 including a plurality of active elements, two of which are indicated as 204 and 206. All of the active elements, including the elements 204 and 206, are communicatively coupled via media 208. A second vehicle 210 includes an active network 212 including a plurality of active elements, two of which is indicated as 214 and 216. All of these active elements, including the active elements 214 and 216, are communicatively coupled via media 218. Each of the active elements 204 and 206 includes wireless communication capability, and similarly, each of the active elements 214 and 216 includes wireless communication capability. For example, the active elements 204, 206 and 214, 216 may incorporate a radio frequency transceiver permitting these devices to communicate via radio frequency transmissions.

As shown in FIG. 13, the active element 204 is communicatively coupled with the active element 214 via radio frequency transmissions 220, and the active element 206 is communicatively coupled with the active element 216 via radio frequency transmissions 222. In this manner, multiple vehicles may be linked via the active elements disposed within the active networks. Linking the active networks in this manner effectively expands the active networks of both vehicles, and hence the number of communication paths available to link devices in any of the linked vehicles. An automobile may be communicatively coupled to a trailer that it is towing. Two vehicles traveling together can be linked in order to exchange messages, vehicle functional data, entertainment programming, etc. For example, passengers in linked vehicles may jointly play electronic games or watch video programming. A vehicle disabled because of the failure of one or more devices may be rendered operable in tandem with a rescue vehicle to which it is linked by using the functioning devices in the rescue vehicle to provide the function to both. Similarly, if a device becomes isolated in a vehicle because of a failure of a portion of the active network, communication to the device may be reestablished using a linked surrogate vehicle to provide communication paths to the isolated device.

While all of the active elements forming an active network may include radio frequency transmission capability, for inter-vehicle linking of active networks, as opposed to intra-vehicle linking of active elements, linking may be limited to selected ones of the active elements. These selected active elements may include security, authentication, encryption, etc. capability. Thus, while an active element within the vehicle may wirelessly link to virtually any other active element within the active network, active networks may be limited to linking via particular active elements. Moreover, the types and quantities of data exchanged may be limited. For linked active networks with low security and lacking encryption, the link may be limited to transmission of non-identifying vehicle operating data. For example, in a one-to-many broadcast application, a vehicle's headlights may be modulated to signal on-coming traffic about a traffic event. In this case, the signaling vehicle's headlights are a first wireless interface, and a photo-diode or similar device on the receiving vehicle is a second wireless interface. Many vehicles may report the event in this or similar fashion, and many other vehicles may receive the reported information thus establishes a many-to-many multicast.

One of the many applications of linking of active networks is the ability to upgrade systems by upgrading software within vehicles without having the vehicle return to a repair facility. Vehicles may identify upgraded software via the linking of active networks and request a copy of the upgraded software be communicated to the active network. While this process may be made seamless and transparent to the vehicle operator, safeguards may be included permitting the vehicle operator to authorize any such sharing and implementation of such upgraded software. Navigation, entertainment, and other similar program data may be shared via the inter-vehicle linking of active networks.

Figure 15:
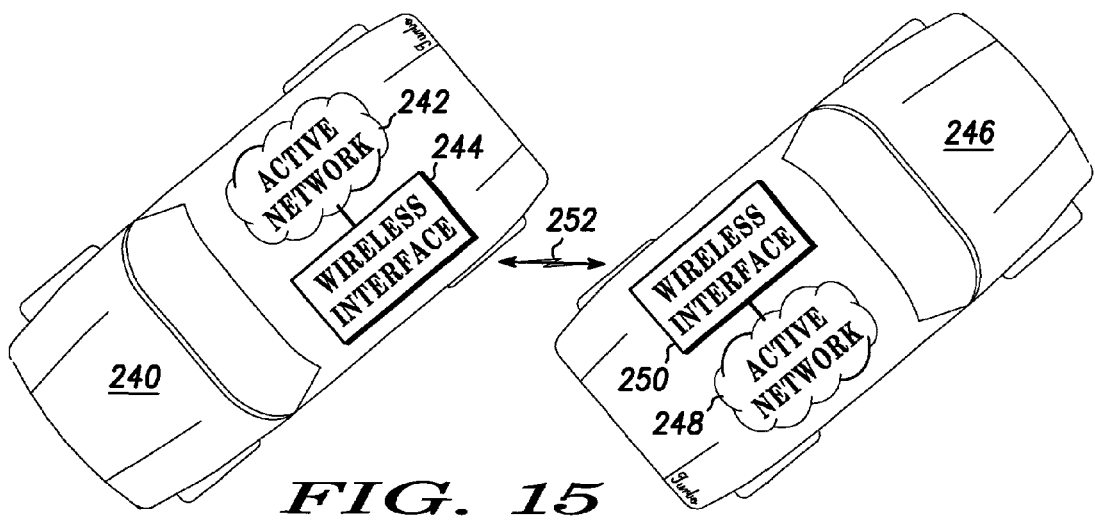
FIG. 15 is a block diagram illustration of linked active networks according to an alternate embodiment of the invention.

FIG. 15 illustrates an alternate arrangement for wireless coupling of active networks across vehicles. A first vehicle 240 includes an active network 242 including a plurality of active elements. Coupled to the active network 242 is a wireless interface 244. A second vehicle 246 includes an active network 248 including a plurality of active elements. The second vehicle 246 also includes a wireless interface 250. Each wireless interface 244 and 250 includes a suitable transceiver, such as an optical or radio frequency transceiver, and each may also include processing capability and memory. The wireless interfaces 244 and 250 arbitrate the wireless linking of the active networks 242 and 248 providing required authentication, security and encryption.

Figure 16:
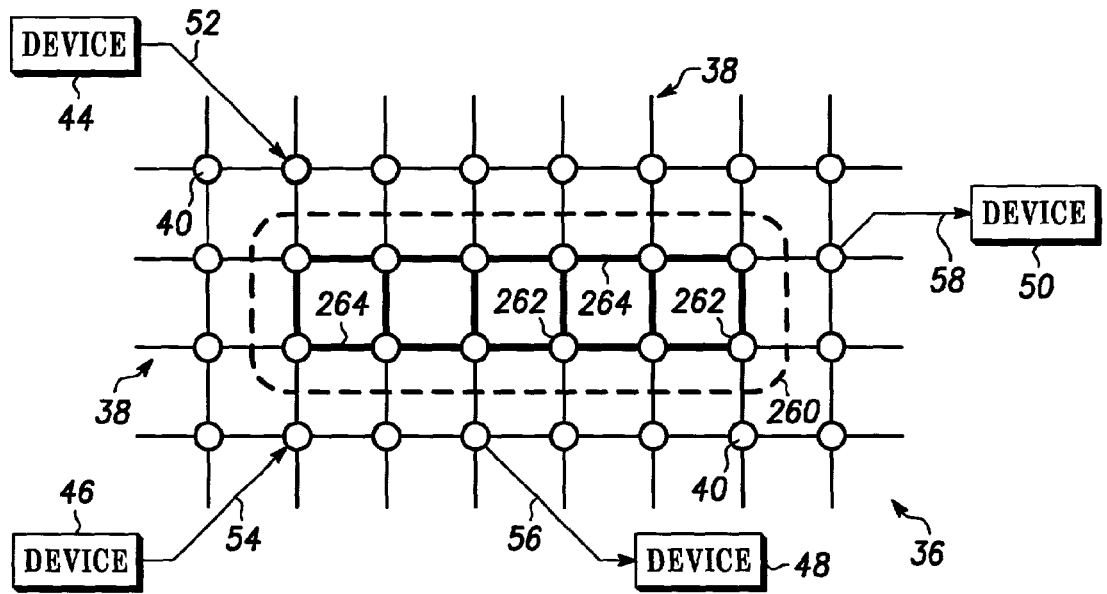
FIG. 16 is a graphic illustration of an alternate embodiment of a vehicle active network according to the invention incorporating a core portion.

Referring now to FIG. 16, the active network 36 (FIG. 4) is adapted to include a core network portion 260. The core network portion 260 includes a plurality of core active elements 262. The core active elements 262 are communicatively coupled only to other active elements, whether core active elements 262 or other, peripheral active elements 40 forming a peripheral portion of the active network 36. High-speed media 264 provides interconnections between core active elements 262. In this manner, data may be transferred through the core network portion 260 at a first, high data rate, and transferred to/from devices coupled to the active network 36 at a second, slower data rate. Alternatively, the interconnection of the core active elements may be made using multiple communication links providing enhanced communication capacity. Devices are coupled to the active network via the peripheral active elements.

Figure 17:
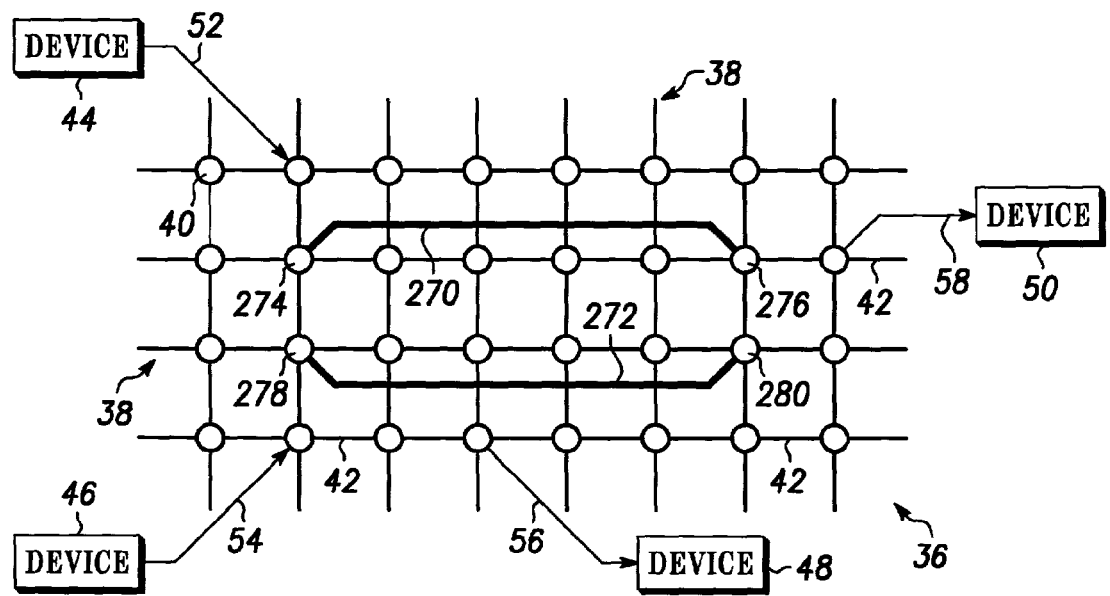
FIG. 17 is a graphic illustration of an alternate embodiment of a vehicle active network illustrating adaptable scalability.

FIG. 17 illustrates the active network 36 adapted to include "fat pipe" members 270 and 272. Fat pipe members 270 and 272 provide direct coupling of the active element 274 to the active element 276 and the active element 278 to the active element 280, respectively. The fat pipe members 270 and 272 may be, and generally are high speed data carrying members adapted for particular applications, and may be particularly adapted to provide scalability in an after-market arrangement, such as coupling a DVD player to a video display. In that regard, the original equipment active elements may be replaced with the active elements 274-280 capable of handling the higher data capacity of the fat pipe members 270 and 282. Alternatively, the fat pipe members 270 and 272 may provide scalability in original equipment applications. For example, the fabric 38 may be configured for a base level of vehicle options, while premium options are provided by adding the fat pipe members 270 and 272.

Figure 18:
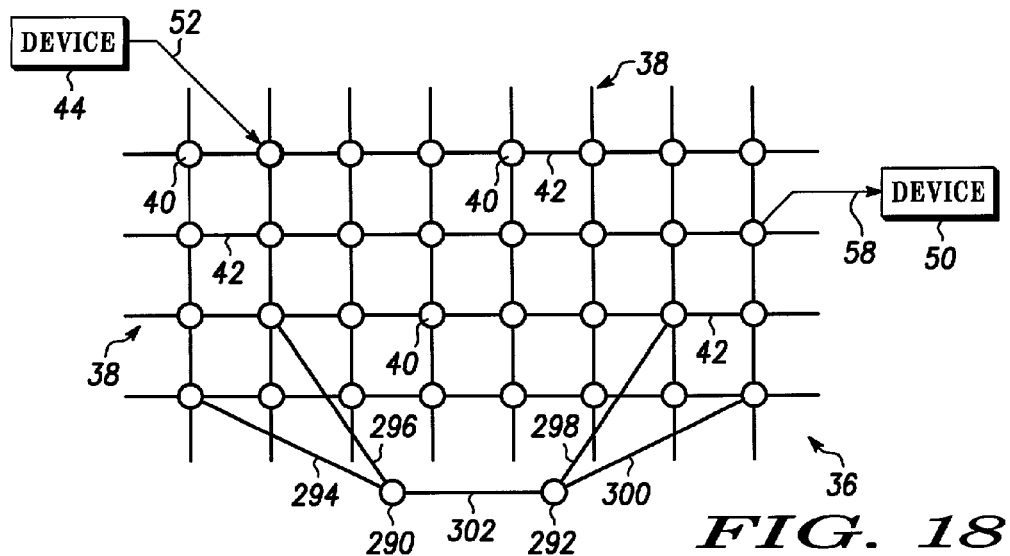
FIG. 18 is a graphic illustration of an alternate embodiment of a vehicle active network illustrating adaptable scalability.

FIG. 18 illustrates the active network 36 adapted with additional active elements 290 and 292 and connection media 294-302 coupling the active elements 290 and 292 to the active network 36. FIG. 18 illustrates the manner in which active networks in accordance with the invention may be expanded, by adding connection media and additional active elements to the fabric as needed. If necessary, existing active elements may be replaced with active elements having a sufficient number of ports to be able to add the connection media 294-302. Moreover, the connection media 294-302 may have a higher data capacity than the existing connection media 294-302. As will be further appreciated from the embodiments of the invention illustrated in FIGS. 17 and 18, the fabric including either the "fat pipe" members or the additional active elements does not need to have a uniform configuration, and may have an asymmetric configuration.

Figure 19:
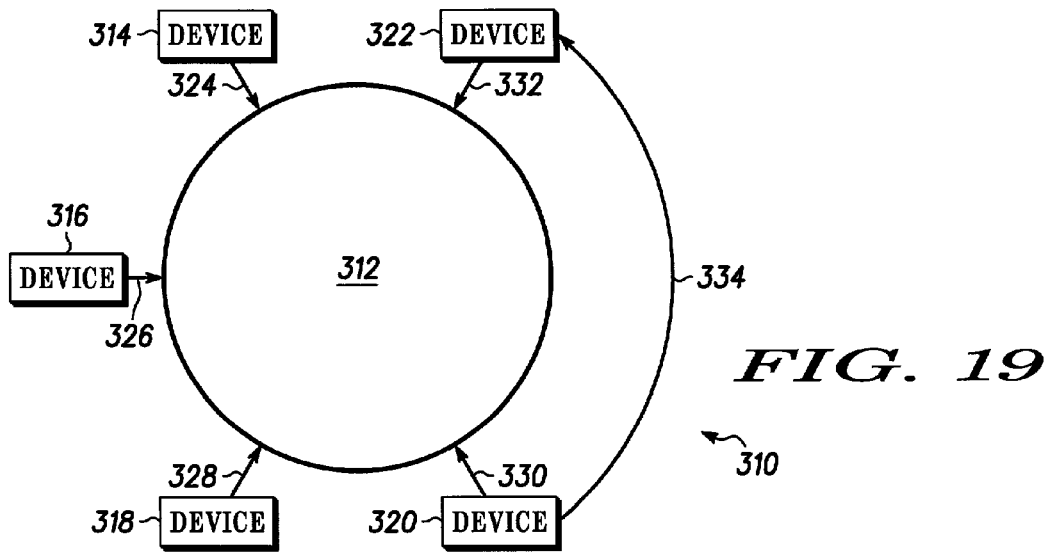
FIG. 19 is a block diagram illustration of a topology for a vehicle active network according to a preferred embodiment of the invention.
Figure 20:
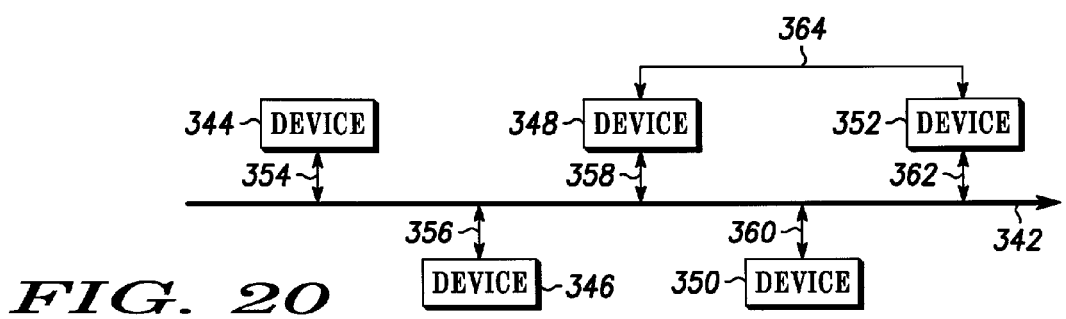
FIG. 20 is a block diagram illustration of a topology for a vehicle active network according to an alternate preferred embodiment of the invention.

FIGS. 19 and 20 illustrate alternative active network configurations. In FIG. 19, an active network 310 includes a ring 312 of interconnected active network elements (not depicted). A plurality of devices 314-322 is communicatively coupled by interfaces 324-332, respectively to the ring 312 in a multi-drop arrangement. Additionally, devices 320 and 322 are coupled for peer-to-peer communications by communication link 344. Communication link 334 may be formed of any suitable media, including wire, optical, radio frequency or combinations thereof. The device 320 therefore may communicate with the device 322 via the network 312 or directly via the peer communication link 334.

In FIG. 20, an active network 340 includes a backbone 342 of interconnected active elements to which a plurality of devices 344-352 is communicatively coupled by interfaces 354-362, respectively to the backbone in a multi-drop arrangement. Additionally, devices 348 and 352 are coupled for peer-to-peer communications by communication link 364. Communication link 364 may be formed of any suitable media, including wire, optical, radio frequency or combinations thereof. The device 348 therefore may communicate with the device 352 via the network 340 or directly via the peer communication link 364.

Figure 21:
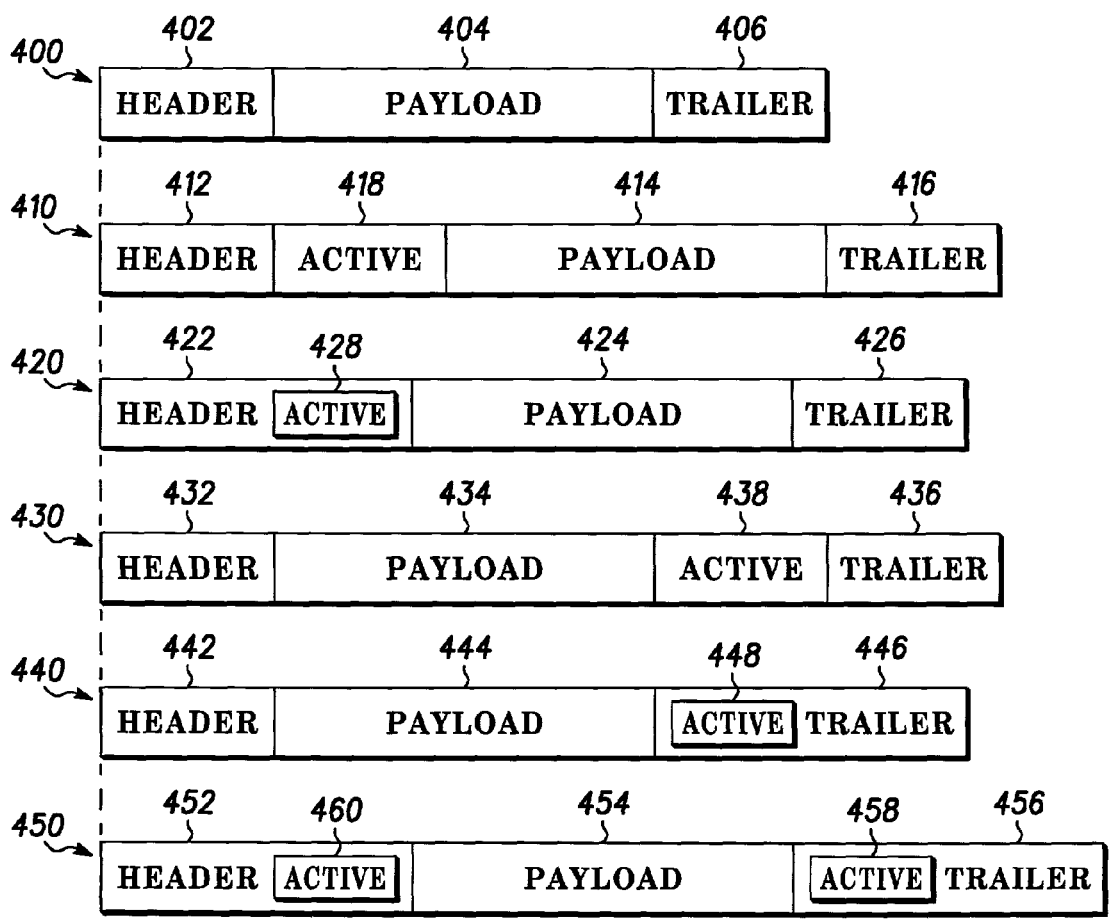
FIG. 21 illustrates various data packets that may be adapted for use with a vehicle active network according to the preferred embodiments of the invention.

FIG. 21 illustrates several data packet configurations that may be used in connection with active networks according to the embodiments of the invention. As described, the active networks may be configured to operate in accordance with TCP/IP, ATM, RapidIO, Infiniband and other suitable communication protocols. These data packets include structure to conform to the standard required. A typical data packet, such as the data packet 400 includes a header portion 402, a payload portion 404 and a trailer portion 406. As described herein, the active network and the network elements forming the active network may contain processing capability. In that regard, a data packet 410 includes along with a header portion 412, payload portion 414 and trailer portion 416 an active portion 418. The active portion may cause the network element to take some specific action, for example providing alternate routing of the data packet, reconfiguration of the data packet, reconfiguration of the network element, or other action, based upon the content of the active portion. The data packet 420 includes an active portion 428 integrated with the header portion 422 along with a payload portion 424 and a trailer portion 426. The data packet 430 includes a header portion 432, a payload portion 434 and a trailer portion 436. An active portion 438 is also provided, disposed between the payload portion 434 and the trailer portion 436. Alternatively, as shown by the data packet 440, an active portion 442 may be integrated with the trailer portion 444 along with a payload portion 446 and a header portion 448. The data packet 450 illustrates a first active portion 460 and a second active portion 458, wherein the first active portion 460 is integrated with the header portion 452 and the second active portion 458 is integrated with the trailer portion 456. The data packet 450 also includes a payload portion 454. Certainly numerous other arrangements of the data packets for use with the present invention may be envisioned.

The data, and particularly the data packets, sent within the active network may be encrypted. The encryption function may be provided by the interface of the device to the active network, e.g., interfaces 22-28 (FIG. 1) or by the active network element of the active network to which the device is coupled. Data may be encrypted to ensure that it is not altered as it is communicated within the active network, which may be important for the proper function of various safety systems of the vehicle or to ensure compliance with governmental regulation. A suitable public or private key encryption algorithm may be employed, and the data may be encrypted before being packetized or the individual data packets may be encrypted after packetization. Moreover, detecting errors in the data upon decrypting may provide an indication of an error or fault condition in the active network along the route utilized by data packet, which caused the corruption of the data packet.

The active portion of the data packet may represent a packet state. For example, the active portion may reflect a priority of the data packet based on aging time. That is, a packet initially generated may have a normal state, but for various reasons, is not promptly delivered. As the data packet ages as it is routed through the active network, the active portion can monitor time since the data packet was generated or time when the packet is required, and change the priority of the data packet accordingly. The packet state may also represent an error state, either of the data packet or of one or more elements of the active network. The active portion may also be used to messenger data unrelated to the payload within the network, track the communication path taken by the data packet through the network, provide configuration information (route, timing, etc.) to active elements of the active network, provide functional data to one or more devices coupled to the active network or provide receipt acknowledgment.

The invention has been described in terms of several embodiments, including a number of features and functions. Not all features and functions are required for every embodiment of the invention, and in this manner the invention provides an adaptable, fault tolerant, active network architecture for vehicle applications. The features discussed herein are intended to be illustrative of those features that may be implemented; however, such features should not be considered exhaustive of all possible features that may be implemented in a system configured in accordance with the embodiments of the invention.

We claim:

1. In a vehicle comprising a first device and a second device, an active network communicatively coupling the first and second devices,
    wherein the active network comprises a fabric of active network elements such that each of the active network elements is interconnected to a plurality of other active network elements of the fabric of active network elements via a corresponding plurality of point-to-point connections each of which connects no more than two active network elements to one another,
    wherein the active network elements are configured to route data packets through the fabric of active network elements to provide at least one communication path selected from multiple potential communication paths between the first device and the second device.

2. The vehicle of claim 1, wherein the active network supports multiple, simultaneous communication paths between the first and the second device.

3. The vehicle of claim 1, wherein the active network complies with an Internet protocol standard.

4. The vehicle of claim 1, wherein the active network comples with asynchronous transfer mode protocol.

5. The vehicle of claim 1, wherein at least one of the active network elements comprises a router.

6. The vehicle of claim 1, wherein at least a portion of the active network elements are linked electronically.

7. The vehicle of claim 1, wherein at least a portion of the active network elements are linked by radio frequency.

8. The vehicle of claim 1, wherein the active network elements are arranged in an array topology.

9. The vehicle of claim 1, wherein the active network communicatively couples at least one additional device to the first and second devices.

10. Apparatus comprising:
an active network of an automobile configured to communicatively couple a first device of the automobile and a second device of the automobile,
wherein the active network comprises a fabric of active network elements such that each of the active network elements is interconnected to a plurality of other active network elements of the fabric of active network elements via a corresponding plurality of point-to-point connections each of which connects no more than two active network elements to one another,
wherein the active network elements are configured to route data packets through the fabric of active network elements to provide at least one communication path selected from multiple potential communication paths between the first device and the second device.

11. The apparatus of claim 10, wherein the active network supports multiple, simultaneous communication paths between the first device and the second device.

12. The apparatus of claim 10, wherein the active network complies with an Internet protocol standard.

13. The apparatus of claim 10, wherein the active network complies with asynchronous transfer mode protocol.

14. The apparatus of claim 10, wherein at least one of the active network elements comprises a router.

15. The apparatus of claim 10, wherein at least a portion of the active network elements are linked electronically.

16. The apparatus of claim 10, wherein at least a portion of the active network elements are linked by radio frequency.

17. The apparatus of claim 10, wherein the active network elements are arranged in an array topology.

18. The apparatus of claim 10, wherein the active network communicatively couples at least one additional device to the first and second devices.

19. A method comprising:
adding at least one additional active element;
adding connection media coupling the at least one additional active element to an active network of an automobile, wherein the active network is configured to communicatively couple a first device of the automobile and a second device of the automobile,
wherein the active network comprises a fabric of active network elements such that each of the active network elements is interconnected to a plurality of other active network elements of the fabric of active network elements via a corresponding plurality of point-to-point connections each of which connects no more than two active network elements to one another, and
wherein the active network elements are configured to route data packets through the fabric of active network elements to provide at least one communication path selected from multiple potential communication paths between the first device and the second device.

20. The method of claim 19, wherein the active network communicatively couples at least one additional device to the first and second devices.

* * * * *